Sept. 24, 1963

F. L. LAWRENCE 3,104,620

PUMP MOUNTING

Filed Feb. 16, 1961

INVENTOR
Frank L. LAWRENCE

BY

ATTORNEY

Sept. 24, 1963  F. L. LAWRENCE  3,104,620
PUMP MOUNTING
Filed Feb. 16, 1961  2 Sheets-Sheet 2
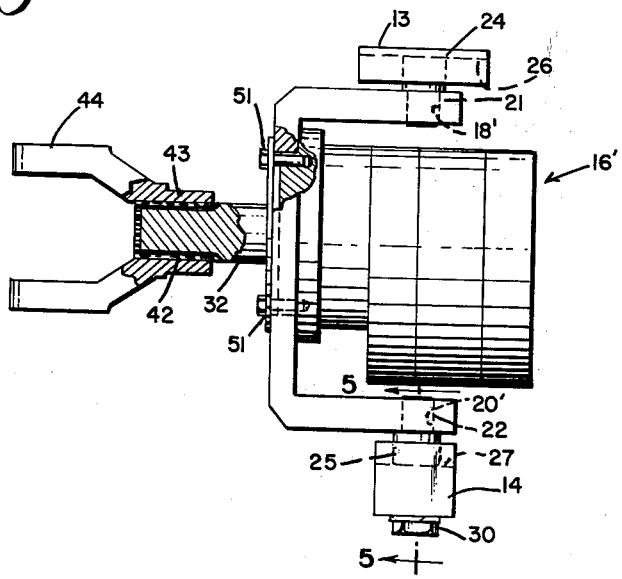
Fig. 3
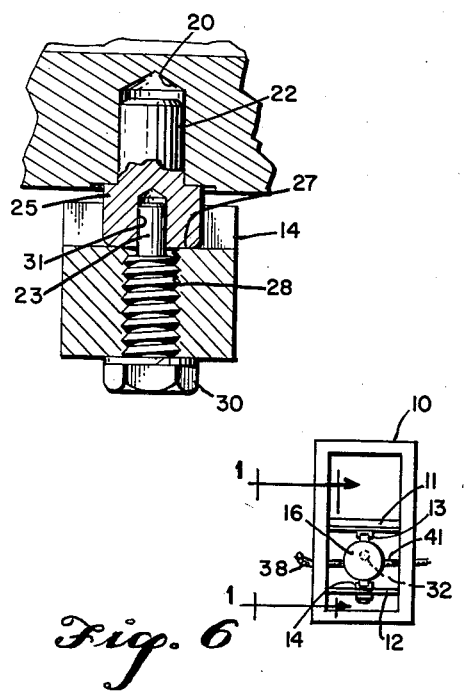
Fig. 4
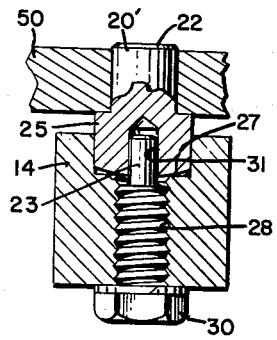
Fig. 5
Fig. 6
INVENTOR
Frank L. LAWRENCE
BY
ATTORNEYS

United States Patent Office 3,104,620
Patented Sept. 24, 1963

3,104,620
PUMP MOUNTING
Frank L. Lawrence, Surrey, British Columbia, Canada, assignor to Aerialmatic Engineering Ltd., a corporation of British Columbia, Canada
Filed Feb. 16, 1961, Ser. No. 89,681
3 Claims. (Cl. 103—218)

This invention relates to a mounting device for a shaft driven mechanism and more particularly to a mounting device located on the forward part of a tractor frame to mount a hydraulic pump.

When a tractor or other mobile vehicle is provided with a power take-off unit such as a hydraulic pump, the stresses imposed upon the mounting during operation of the tractor present many problems. The tractor motor vibrates on its own mounts to cause vibration of the output shaft of the tractor. This effects misalignment or displacement of the drive shaft with respect to the shaft of the pump, making mounting of the pump and coupling of the shafts more difficult. The result has been, heretofore, extreme wear on the two universals which previous installations have required. Previous installations have been furthermore objectionable in that it has been difficult to remove the pumps from the tractor for purposes of servicing or replacement.

Therefore an object of my invention is to provide a mounting means which will allow for a certain amount of misalignment between the driven shaft of the pump and the power take-off shaft of the tractor without any damage to the parts.

A further object is to provide a rugged mounting device which will withstand the expected rigors of tractor usage, and which permits the pump unit to be installed and removed with ease and expedition.

More particular objects and advantages will appear and be understood in the course of the following description and claims, the invention consisting in the novel construction and in the adaptation and combination of parts hereinafter described and claimed.

In the accompanying drawings:

FIG. 3 is a reduced scale view similar to FIG. 1 illustrating a second embodiment of the invention.

FIG. 4 is a fragmentary longitudinal vertical sectional view on line 4—4 of FIG. 2.

FIG. 5 is a fragmentary transverse vertical sectional view on line 5—5 of FIG. 3; and FIG. 6 is a somewhat schematic front elevational view showing the hydraulic pump mounted on the O-frame of a tractor which commonly surmounts the main frame of a tractor at the front end of the latter.

Figure 1:
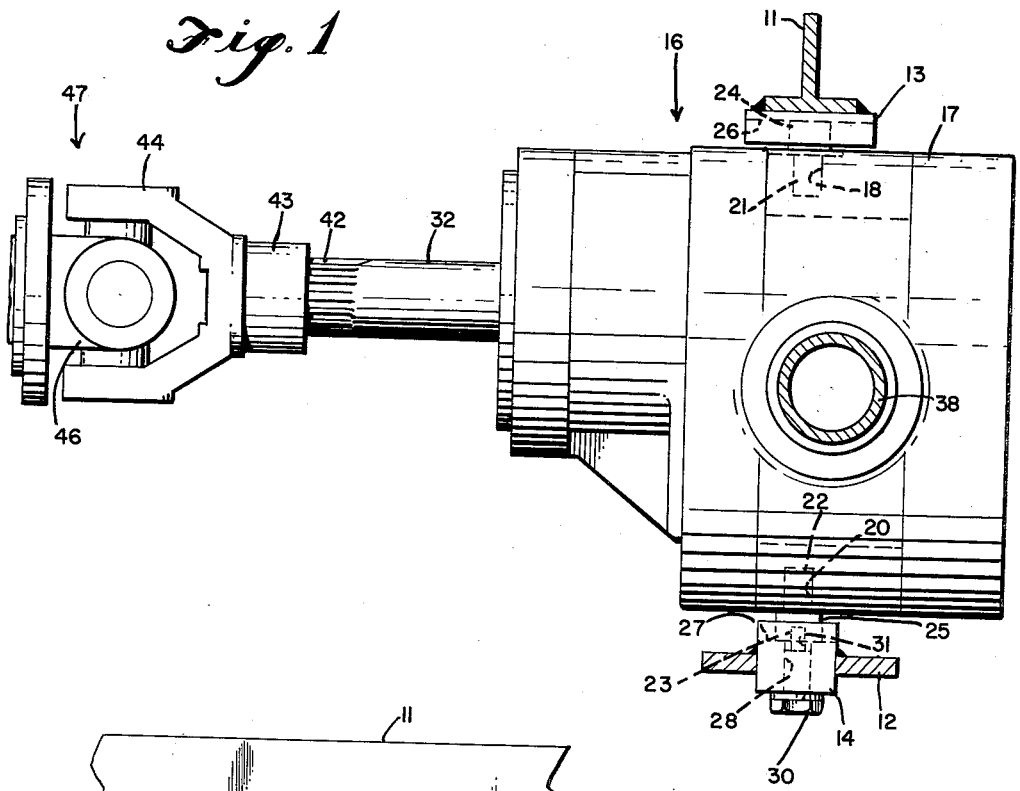
FIGURE 1 is a fragmentary longitudinal vertical sectional view on line 1—1 of FIG. 6 illustrating one embodiment of the present invention.
Figure 2:
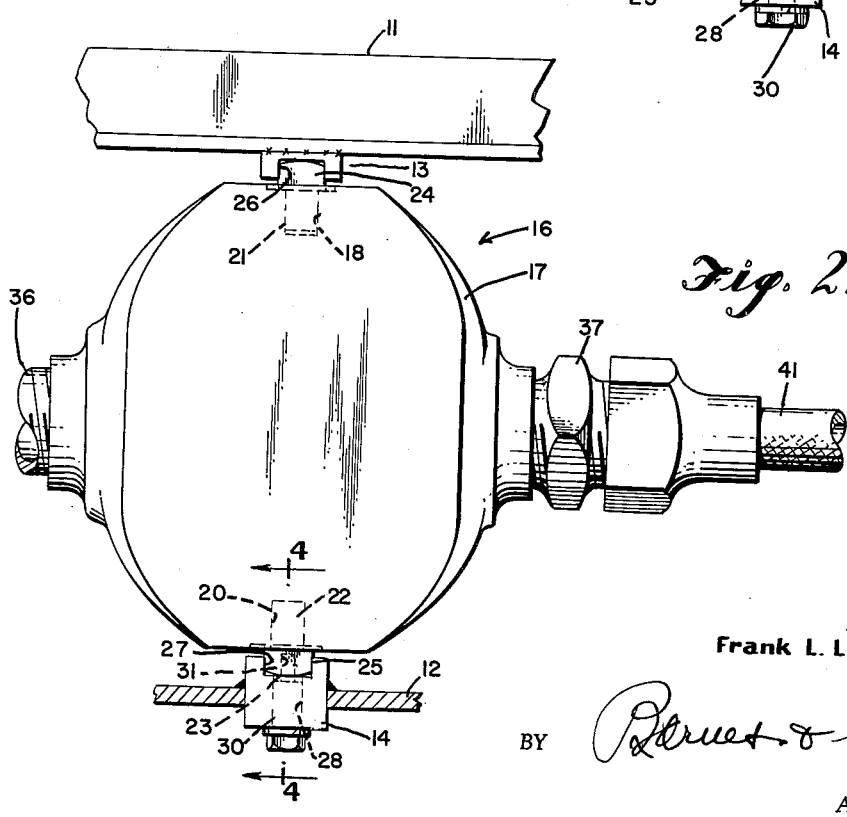
FIG. 2 is a fragmentary front elevational view thereof.

Referring to FIG. 6, numeral 10 designates an O-frame located at the forward end of a tractor, and which normally is protected by a perforated guard plate. Extending transversely between, and welded or otherwise rigidly attached to, the two sides of the O-frame are a horizontal T-bar 11 located at about the mid-height of the O-frame and a flat bar 12, lying directly below and parallel to the T-bar. These bars, more especially, are located so as to lie above and below the axis of the take-off shaft of the tractor engine, such engine lying immediately to the rear of said O-frame. Welded to the T-bar 11 and the flat bar 12, respectively, are an upper channel 13 and a lower channel 14, which serve to support a hydraulic pump 16 removably mounted therebetween. The longitudinal axes of the channels are parallel to one another and normal to the plane occupied by the T-bar 11 and the flat bar 12.

Provided in opposite sides of the pump housing 17 are two cylindrical sockets 18 and 20, to accommodate respectively the journal mounting of two co-axial trunnion members 21 and 22. Formed integrally with the journaled portion of the trunnions are square exposed heads 24 and 25 which fit slidably into the troughs 26 and 27 of the channels 13 and 14, in a tongue and groove arrangement. These troughs face each other, are directly opposite one another and occupy the same longitudinal plane.

Threaded from the back side of the lower channel 14 into a through-hole 28 which is tapped in the channel 23 is a cap-screw 30 which presents a stud prolongation 23 upon its inner end. This stud lodges in a mating hole 31 provided in the square head 25 of the trunnion 22 to secure said trunnion against motion endwise to the axis of the channel 14.

To draw fluid by a side fitting 36 into a pump and discharge the same by a side fitting 37 from a discharge port, the pump rotor is turned by a drive shaft 32 projecting from the back end of the pump on a longitudinal horizontal axis. Flexible inlet and outlet hoses 38 and 41, respectively, are attached to the pump by means of said fittings 36 and 37.

As above stated, the rotary axis of the shaft 32 is parallel to the longitudinal axes of the channels 13 and 14. The exposed head end of such shaft is splined for sliding engagement in the splined socket of one hub 43 of a universal 47. The hub, a yoke 44 integral therewith, and a connecting yoke 46 of said universal are or may be conventional. A hub integral with said second yoke 46 is attached in turn to the power take-off shaft (not shown) of the tractor.

In use, when the pump 16 is to be installed, the perforated guard plate hereinbefore referred to is removed from the O-frame. The two trunnions 21 and 22 are set into their mating sockets 18 and 20. The pump is now slid into place by placing the square heads 24 and 25 of the trunnions 21 and 22 in registration with the troughs of the channels 13 and 14 and sliding said heads inwardly along the channels. Co-incident with this action the splines 42 of the shaft 32 are slidably engaged in the hub 43 of the universal joint. When the hole 31 reaches the position in which it registers with the tapped hole 28 of the lower channel 14, the stud 30 is threaded into said tapped hole and its stud prolongation socketed in such hole 31, thus localizing the pump against movement endwise to the axis of its shaft 32. The inlet hose and outlet hose are now attached to the pump, and the pump installation is complete.

It will be apparent that the installed pump is both rotatably and slidably mounted with respect to the upper channel, and is rotatably mounted with respect to the lower channel.

It is desirable that there be moderate tolerance between the stud prolongation 23 and its socket 31. If there is a certain amount of vertical motion or displacement between the universal joint 47 and the channels, there will be some rotation of the pump about a transverse horizontal axis passing through the stud 23. This will give minor reciprocal slide motion of the upper trunnion 21 in the upper channel 13. Any motion or displacement of the universal joint 47 horizontally with respect to channels 13 and 14 is accommodated in that the pump trunnions 21 and 22 are free to pivot about a common vertical axis. If the axis of pump shaft 32 and the axis of the engine take-off shaft should become non-parallel, either with or without any lateral displacement of the drive shaft with respect to the channels 13 and 14, the universal joint compensates for same.

The second embodiment of my invention as illustrated in FIGS. 3 and 5 employs a yoke 50 firmly secured by bolts 51 to a pump housing 16'. Counterparts 18' and 20' of the holes 18 and 20 are in this embodiment found in the arms of the yoke. In other respects this second embodiment is the same as the first embodiment.

It is to be understood that the O-frame 10 of the tractor could itself be used as a fluid reservoir, in which case the flexible hose 38 would connect said reservoir with the pump inlet 36. Whether this or another reservoir is employed fluid would perforce be led thereto by a return line from the working elements of the tractor's hydraulic system.

It is believed that the invention will have been clearly understood from the foregoing detailed description of my now-preferred illustrated embodiment. Changes within the spirit of the invention will suggest themselves. It is my intention that no limitations be implied and that the hereto annexed claims be given the broadest interpretation to which the employed language fairly admits.

What I claim is:

1. The combination comprising: a flexibly mounted engine, a frame lying to the front of said engine and providing side members spaced apart to define an opening therebetween, the engine having a power take-off shaft pointing toward said opening, two channels rigidly mounted in said opening to occupy parallel spaced positions with the troughs of said channels extending longitudinally of the opening and with said troughs directly opposite and facing one another in a common plane, a rotary pump occupying the space between said channels and at its opposite sides presenting co-axial sockets facing said channels, said coinciding axis of the sockets being normal to said common plane of the troughs, a pair of complementary mounting members each slidably received one in the trough of one channel and the other in the trough of the other channel, said members each presenting a respective one of two inwardly directed co-axial trunnion pins each journaled for swivel motion in a respective one of said two pump sockets to support the pump for rotation about the center of the trunnion pins as an axis, a rotary input shaft for driving the pump, the rotary axis of said input shaft being substantially normal to said center of the trunnion pins, a universal joint connecting said pump shaft to the take-off shaft, and means for releasably fixing at least one of said trunnion pins against motion within its said trough.

2. The combination comprising: a tractor powered by a flexibly mounted engine having a power take-off shaft, an O-frame on the front of said tractor, two open-end channels rigidly mounted in the opening of said frame to occupy parallel spaced positions with the troughs of the channels extending longitudinally of the tractor directly opposite and facing one another, a rotary pump occupying the space between said channels and at its opposite sides presenting co-axial sockets facing said channels, a pair of complementary mounting members each received for slide movement one in the trough of one channel and the other in the trough of the other channel, said members each presenting a respective one of two inwardly directed co-axial trunnion pins each journaled in a respective one of said two pump sockets and acting to support the pump for rotation about a common axis normal to the slide axes, an input shaft for driving the pump, the rotary axis of said shaft being substantially normal to the axis of said trunnion pins, a universal joint connecting said pump shaft to the take-off shaft, and means for releasably fixing at least one of said trunnion members in a localized position within its said trough.

3. Structure according to claim 2 in which said universal slidably engages the pump shaft by means of a spline.

References Cited in the file of this patent
UNITED STATES PATENTS

| | | |
|---|---|---|
| 793,942 | Leach | July 4, 1905 |
| 1,992,500 | Morgan | Feb. 26, 1935 |
| 2,214,677 | North | Sept. 10, 1940 |
| 2,256,423 | Crewdson | Sept. 16, 1941 |